United States Patent [19]

Teller

[11] 3,839,846

[45] Oct. 8, 1974

[54] PROCESS AND APPARATUS FOR TREATMENT OF JET ENGINE EXHAUST

[75] Inventor: Aaron J. Teller, Great Neck, N.Y.

[73] Assignee: Teller Environmental Systems, Inc., Worcester, Mass.

[22] Filed: May 3, 1972

[21] Appl. No.: 249,903

[52] U.S. Cl............................ 55/15, 55/90, 55/93, 55/233, 55/DIG. 30
[51] Int. Cl............................................. B01d 53/14
[58] Field of Search............ 55/15, 84, 89, 90, 223, 55/233, 277, 93, 94, DIG. 30; 60/39.5

[56] References Cited
UNITED STATES PATENTS

| | | | |
|---|---|---|---|
| 2,935,375 | 5/1960 | Boucher | 55/15 |
| 3,172,744 | 3/1965 | Fortman et al. | 55/277 |
| 3,324,630 | 6/1967 | Teller et al. | 55/90 |
| 3,473,298 | 10/1969 | Berman | 55/257 |
| 3,494,099 | 2/1970 | Eng et al. | 55/15 |
| 3,495,384 | 2/1970 | Alliger | 55/277 |
| 3,613,333 | 10/1971 | Yardellier | 55/89 |
| 3,681,009 | 8/1972 | Horsley | 55/277 |
| 3,684,054 | 8/1972 | Lemmerman | 60/39.5 |
| 3,708,958 | 1/1973 | Duty | 55/89 |

Primary Examiner—Charles N. Hart
Attorney, Agent, or Firm—Thompson, Birch, Gauthier & Samuels

[57] ABSTRACT

Process and apparatus for treating hot exhaust gases having high noise level and containing solid and/or liquid particles therein, such as exhausts of jet engines being tested on jet test stands are shown. The process involves the combination of sonic vibrations, augmentation with air and water, nucleation and crossflow scrubbing in a packing which offers impinging surfaces without too great impedance of gas flow. The combination of vibration, augmentation, nucleation by condensing water on the particles and crossflow scrubbing produces a synergistic effect in the removal of particles, reduction of the amount of air augmentation required and noise abatement, thereby producing results greater than would be expected from the use of the individual process steps and apparatus.

11 Claims, 7 Drawing Figures

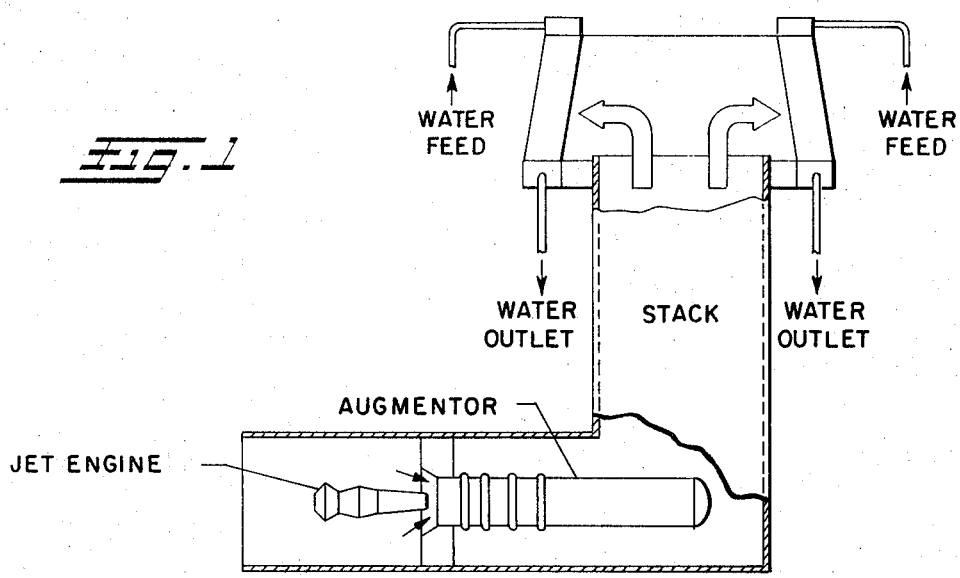
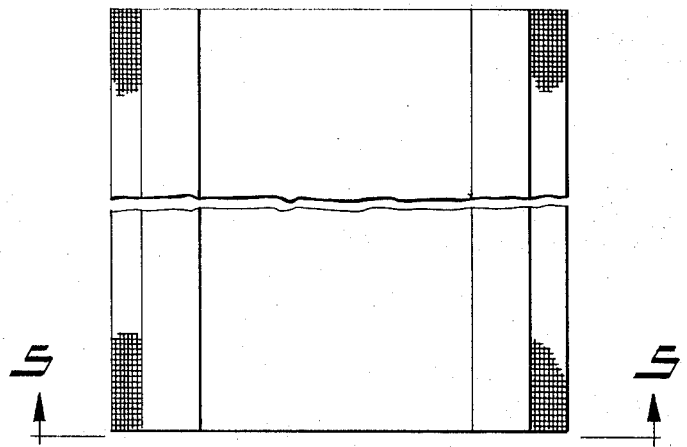
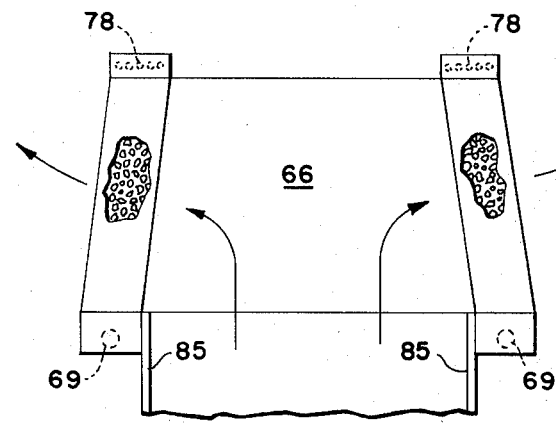

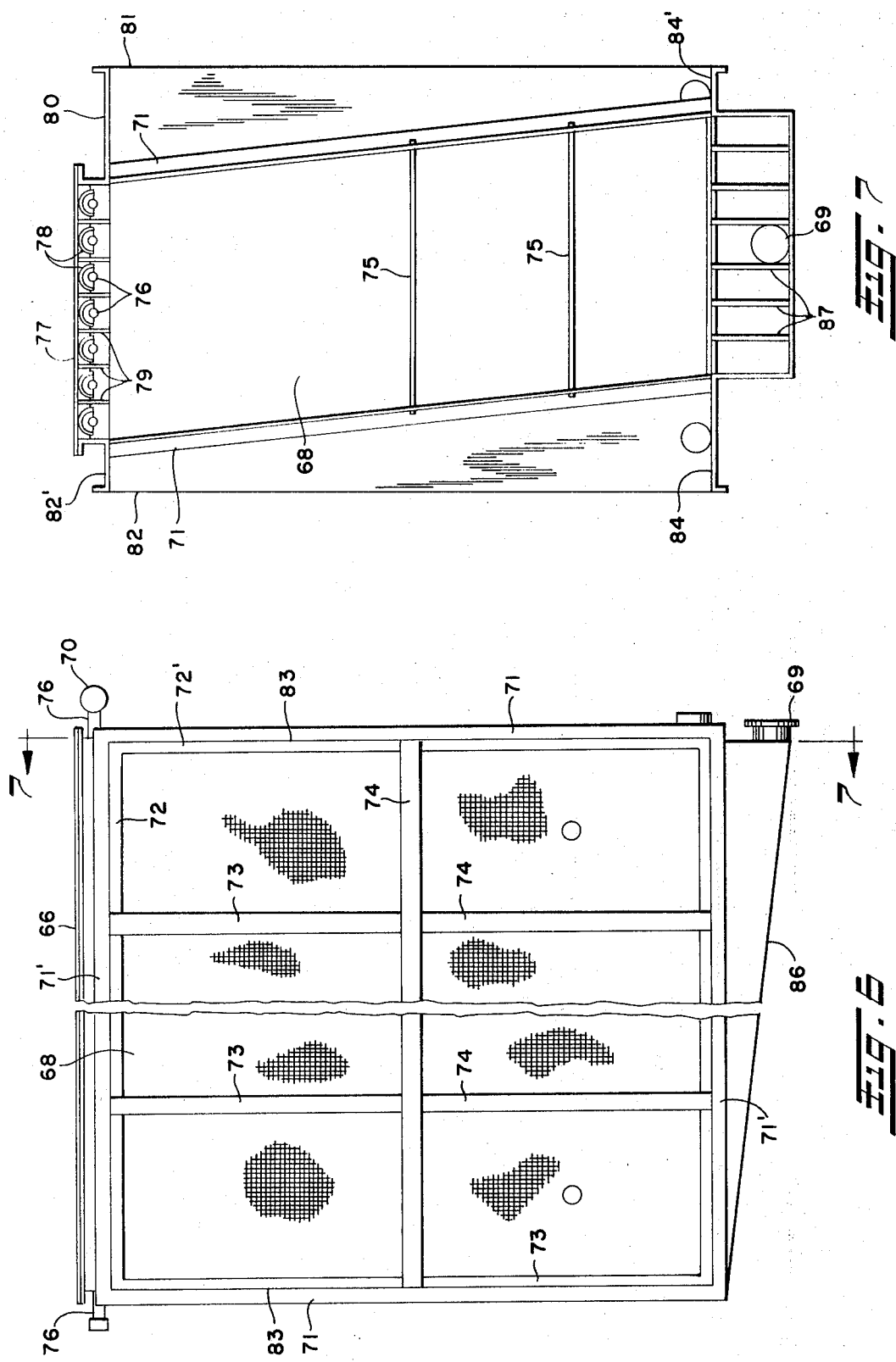

PROCESS AND APPARATUS FOR TREATMENT OF JET ENGINE EXHAUST

BACKGROUND OF THE INVENTION

1. Field of the Invention

This invention relates to a process and an apparatus for treating the hot exhaust gases from jet engines and more specifically to a process and apparatus for treating the exhausts from engines being tested on test stands. Even more specifically, this invention relates to a process and an apparatus for relieving the kinetic energy of the jet engine exhaust by induction of an augmenting air stream and introduction of a vaporizable liquid into the hot gases, and under high vibration effecting nucleation and impingement of the particles in a crossflow scrubber.

2. Related Prior Art

In the conventional testing of jet engines on jet stands, the hot exhaust gases from the operating engine entrain air from the atmosphere surrounding the exhaust stream and transfer to the entrained air flow a portion of their kinetic energy. The induced air stream, referred to generally as augmentation air, dilutes and cools the jet exhaust stream thereby preventing damage to the jet test cell. In typical testing operations, the amount of augmentation air induced by the exhaust flow, ranges from two to four times that of the jet exhaust for turbojets with afterburners and from one half to two times the mass of the jet exhaust for fan jets. The combined stream of cooled jet engine exhaust and augmentation air is then passed to the ambient air.

As jet engines have grown in size, the difficulty of treating the exhaust gases to remove the pollutants therein has increased more than proportionately. The imposition of higher standards of air pollution control by governmental authorities in recent years has made more effective removal of pollutants from the exhaust stream a necessity. The extremely large volumes of gas that must be handled in the pollution abatement equipment downstream of typical jet test stands using air augmentation require very substantial capital investments and operating costs if pollution control standards are to be met.

In a copending application Ser. No. 143,066 filed May 13, 1971, applicant has disclosed a process and apparatus for augmenting the air and introducing a vaporizable liquid in the exhaust stream from a jet engine. In U.S. Pat. No. 3,324,630, issued June 13, 1967, applicant has also disclosed crossflow scrubbing process and apparatus effective for the removal of solid and liquid particles from a gas stream.

STATEMENT OF THE INVENTION

In accordance with the present invention it has now been found that very effective results are produced in reducing the rate of gas flow, reducing the sound level and removing particles from a hot gas stream traveling at a high velocity and containing suspended particles. It has been found that the combination of augmenting the hot gas stream with air and a vaporizable liquid, and effecting nucleation by condensing liquid on the particles under the influence of sonic vibrations, and removal of the particles by impingement on a surface, such as the packing in a cross flow scrubber, produces a synergistic effect in the process whereby improved results are obtained in reducing the velocity of gas flow, reducing the noise level and removing the particles. With the process and apparatus of this invention it is possible to handle a hot gas stream having up to 60,000 lbs. of thrust, and to reduce the noise level to 90–95 decibels. It is possible to handle even higher thrusts by increasing the size of the various units. Moreover the augmentation, scrubbing and other steps are effective without any adverse back effect on the jet engine being tested so as not to alter the performance of that engine.

The vibration found to be effective in the operation of this invention is in the range of 30 to 16,000, preferably 300 to 16,000 Hertzians, which unit is defined as a cycle per second, and the energy of said vibration is advantageously in the range of 40–200, preferably 60–100 decibels. It is found that the vibrations of this character effects nucleation, or the effective increase in growth of particles by condensation, much more effectively and with a gas stream having a lower condensible vapor content therein. For example, where ordinarily the gas should have a saturation point at 160°F., preferably at 180°F. to produce the desired results, it is possible under the present process to use a gas having saturation at as low as 110°F. Moreover, even if a gas is used having a higher saturation of condensible vapor, the nucleation is improved by the vibration over that which would be otherwise produced.

In the augmentation, it is desirable to keep the air augmentation as low as possible so as to reduce the dilution of the particles and thereby make it easier to remove the particles from a higher concentration in the gas stream, and also to reduce the size of the equipment used to handle the stream. According to this invention, it is possible to reduce the augmentation from 0.5–3.0 to 0.3–0.6 by virtue of the nucleation and scrubber being used in combination with the augmentor.

In a typical operation of this process and apparatus, the velocity of the gas coming from a jet engine exhaust at 3,000 feet per second will have a speed exiting from the augmenter at 100–200 feet per second and a gas velocity coming out of the scrubber of 5–7 feet per second, all this reduction without any adverse effect on the operation of the jet engine being tested.

The exhaust gas emitted by a jet engine contains black smoke consisting of particulates of carbonaceous or oily nature. The emissions range from 0.01 gr/scf ro 0.2 gr/scf. The particulates range in size from 0.01 micron for the carbon to about 50 microns for the oil or liquid particles. In the operation of a test cell, the jet engine is fired over a wide range of operating conditions with gas flow ranging from 100 lb/sec to 3000 lb/sec consisting of combustion gas often combined with fan air.

In a preferred modification, the exhaust from the engine enters an augmenter where additional air is introduced into the augmenter tube. In previous operation the ratio of augmentation with air to that of engine exhaust is in the order of 3.0 parts of augmentation air to 1 part of exhaust gas, or 3 to 1. In the present system the ratio of augmentation air is reduced as indicated above by the introduction of a vaporizable liquid and by the combination of steps and equipment used.

In the augmentation step a liquid in fine particulate form is introduced into the hot exhaust gases. The liquid should be vaporizable at the temperature of the hot exhaust. The preferred liquid is water, primarily because of its ready availability and its physical properties. Desirably the water or other liquid is introduced as a jet onto the surface of the cone of hot exhaust gases. In a preferred embodiment, described further below, the vaporizable liquid is introduced together with reduced quantities of augmentation air into the hot exhaust gases.

In the preferred embodiment of the augmentation described below in connection with the drawings, water in a jet or spray is introduced into the stream of hot jet engine exhaust in a mixing zone, in an amount of from 0.05 to 1.5 pounds per pound of exhaust flow together with augmentation air in from 0.01 to 1.2 pounds per pound of exhaust flow. The engine exhaust gases are thereby reduced by combination with the water and augmentation air to a temperature of about 110°–200°F. Desirably, the thusly cooled engine exhaust stream is passed through an apparatus described below in connection with the drawings, and a portion of the cooled gases are recycled back to the mixing zone.

The introduction of a vaporizable liquid, such as water, into the hot jet exhaust stream serves multiple purposes. Firstly, the liquid water is vaporized at the high temperatures of the exhaust stream and the steam which is formed replaces a portion of the air mass which ordinarily would have to be induced in conventional augmentation processes. Thus, there is a net substitution of a condensible augmentation fluid for the air which would otherwise be used. Secondly, the liquid in vaporizing at the high temperatures of the jet exhaust stream removes a very considerable amount of sensible heat from the jet exhaust, thus lowering its temperature. As a primary object of this invention is the cooling of the jet exhaust gases to avoid damage to the jet test cell, the introduction of the water efficiently accomplishes this objective. Although, in conventional jet test cells, water is now introduced to cool the gases, it is introduced downstream of and subsequent to the air mixing and accordingly has no significant effect on the degree of augmentation. Furthermore, the water is generally introduced in the main body of the gas thus causing flow disturbances. These disturbances can in turn cause instability in engine performance and as a result, the degree of augmentation must be increased in order to maintain engine stability.

Finally, the water vapor in the cooled exhaust stream, because it is a condensible vapor, can be readily removed by condensation from the cooled exhaust stream in the preliminary operations of a pollution control system, and thus the volume of the gas to be handled by the pollution control equipment can be substantially reduced. This is most important in adapting existing jet test cell equipment for use with larger jet engines.

In the preferred process and apparatus of this invention, the hot exhaust gases from a jet engine test stand are introduced into the converging section of a venturi which is open to the atmosphere at its upstream end in an annular zone surrounding the jet engine exhaust. The high velocity flow of exhaust gases into the converging section of the venturi induces a flow of augmentation air around the core of the exhaust stream and, by creating a low static pressure, also induces an internal recycle stream of cooled gases and unvaporized water thus reducing the amount of external augmentation. The combined augmentation air and exhaust stream pass through the throat of the venturi into a mixing zone at the vena contracta of the venturi. A jet or spray of water is introduced into the mixing zone. Partial vaporization of the water takes place in the mixing zone and the cooled mixture of exhaust gas, induced air and water vapor passes into an augmenter zone which comprises a tubular outer shell and a substantially concentric tubular inner shell. The inner shell is somewhat shorter in length than the outer shell and has an inner surface which diverges outwardly from the central axis common to both of the tubular shells. The cooled mixture of exhaust gas, induced air and water vapor passes into the diverging inner shell and a portion of the mixture which passes from the inner shell is recycled through the annular space between the shells back to the mixing zone. It has been found that with this augmentation apparatus, which achieves the recycle of a portion of the cooled gases bearing unevaporated water, a considerably more efficient overall augmentation process is achieved.

After the exhaust air, reduced in temperature and still containing the particles, is emitted from the augmenter, it is turned upward, preferably by turning vanes in the bottom of the stack, and conducted upward in the stack to the bottom of a cross-flow scrubber. As previously indicated, the vibration provided to the exhaust gas, coming either inherently in the operation of a jet engine or, in other cases where not so provided, by an additional device adapted to provide similar vibration, aids greatly in the nucleation or condensation of liquid onto the particulates as the gas enters the crossflow scrubber.

By this combination of the equipment, the augmenter is capable of reducing the temperature, velocity rate, etc. with a reduced amount of air, reducing the amount from 45–90 percent of that previously used. Therefore the system has the great advantage of a considerable reduction in total air flow. This reduces the requirement in size of the recovery system and thereby reduces the capital and operating costs.

In the augmenter the gas is quenched to equilibrium temperatures ranging from 100° F. to 180° F. Prior to quenching in the augmenter, the temperature ranges from 200° F. to 2700° F. depending on the mode of operation of the jet engine.

The nucleation scrubbing ordinarily effected in the crossflow scrubber is generally capable of removing particles only greater in size than four microns. However with the synergistic effect produced by the vibration and preliminary treatment in the apparatus and process of this invention, it is capable of removing 75 to 99 percent and higher of the 0.1–1 micron sized particles emitted in the exhaust from jet engines as described herein.

The liquid effluent from the crossflow scrubber, which is generally water containing carbonaceous and oily particulates, after flowing from the scrubber can be separated by various means such as centrifugation, settling, flocculation and/or filtration. After separation of the particles, the water or other liquid may be recycled for spraying into the crossflow scrubber or into the augmenter. In addition to the radical reduction in particle content, and velocity of gas being emitted from the crossflow scrubber, a remarkable reduction in sound level is also found to be produced by the process steps of this invention.

The apparatus and process of this invention are further described in connection with the drawings and in the examples.

In the drawings:

FIG. 1 is a simplified schematic vertical view of the combined apparatus of this invention.

FIGS. 4 and 5 are top and side elevational views respectively of the scrubbing tower portion of the apparatus shown in FIG. 1.

FIG. 6 is a side elevational view of a packed unit of a scrubbing tower embodied in this invention.

FIG. 7 is a front elevational view of the packed unit of FIG. 6 taken at line 7—7 of FIG. 6, and having a modification of an extending wall plate not shown in FIGS. 1 and 5.

In FIG. 1 arrangement is shown of the Jet Engine being tested, the Augmenter positioned to receive the exhaust gas stream, the Stack which receives the gas stream exiting from the Augmenter and turns it upward to feed into the bottom of the Scrubber which causes the gas to flow horizontally through beds of packing on which the particles, either solid or liquid, impinge and are deposited on the packing, with the particles being washed away by the water flowing downward through the bed of packing; and exiting the cleaned, cooled gas into the atmosphere at an acceptable sound level.

Figure 2:
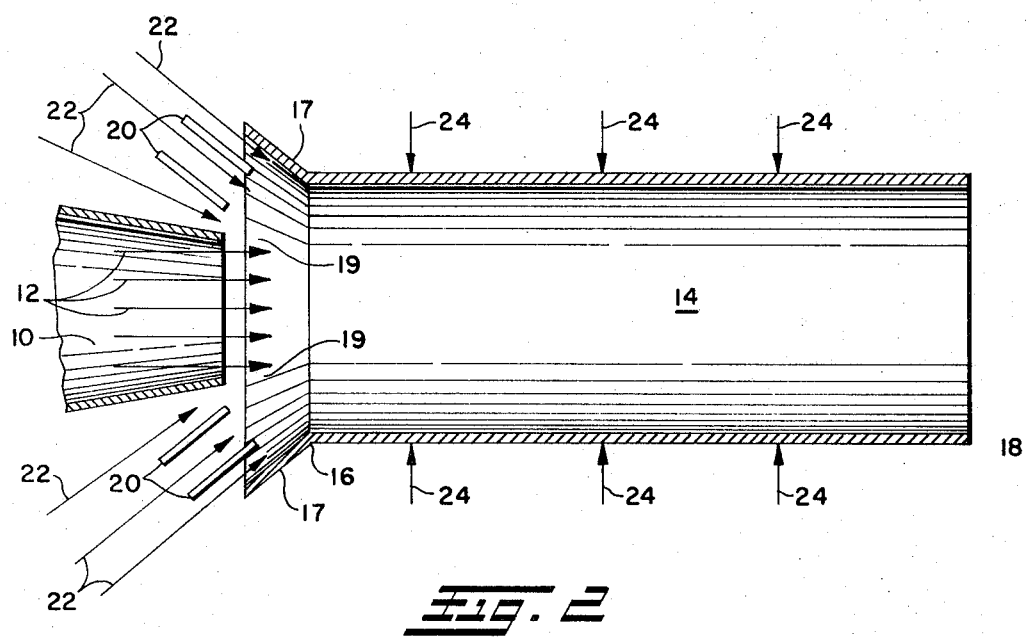
FIG. 2 is a simplified sectional view of an apparatus employing a step of air augment in the process of this invention.

In FIG. 2 reference numeral 10 refers to the after part of a jet engine supported on a jet test stand. The details of the jet test stand are omitted as the stand is not important to the operation of the apparatus or the process. The jet exhaust stream from engine 10 is designated by reference numeral 12. Reference numeral 14 refers to an augmenter zone which comprises a cylindrical tube 15 of round cross section extending from a position behind the after part of engine 10, designated by reference numeral 16, to a further remote location, designated by reference numeral 18. Augmenter zone 14 and engine 10 are essentially coaxial. A converging anterior lip section 17 attached to tube 15 at its forward end 16 is provided to further contain the exhaust.

The function of augmenter zone 14 is to channel the exhaust stream and augmentation streams, which are discussed below, while the energy in the former stream is dissipated and to channel the combined exhaust and augmentation stream to pollution abatement equipment downstream of position 18. Augmenter tube 15 may be made of any suitable material of construction which will withstand the temperatures and velocities of the jet exhaust. Typically, the diameter of zone 14 is from two to six times the diameter of the exhaust orifices of the jet engine.

In the process of this invention a vaporizable liquid is introduced to the hot exhaust stream 12. The liquid may be introduced either as a fine spray at the surface of the hot exhaust stream, as is shown at reference numeral 20, or by penetrating high velocity water jets radially into the exhaust at the vena contracta of the venturi. Any suitable spray or fog generating apparatus 20 may be employed. It has been found that if from 0.05 to 1.5 pounds of water are introduced per pound of exhaust gas, the multiple benefits of reduced total augmentation, maintenance of exhaust stream stability, cooling of the exhaust stream and introduction of a condensible augmentation vapor are achieved.

In a preferred mode of operation with an apparatus as shown in FIG. 2, the jet exhaust stream is augmented with a fine spray of vaporizable liquid, e.g. water, together with a stream of induced augmentation air substantially smaller than the stream of air which would be induced in a conventional augmenter zone. The air augmentation stream is induced through the same annular area as the fog spray. Thus in FIG. 2 reference numeral 22 refers to a stream of air induced by the high velocity jet exhaust. Air stream 22 is also introduced to the surface of the exhaust stream in order to improve the stability of the exhaust stream and prevent reflection of shock waves back into the engine. Where the spray of water is introduced simultaneously with augmentation air it has been found that the exhaust gas temperature can be reduced to about 180°–200° F. upon the introduction of from 0.05 to 1.5 pounds per pound of exhaust of water spray together with from 0.1 to 1.2 pounds per pound of exhaust of augmentation air. This compares favorably with conventional augmentation processes wherein it is necessary to introduce from 0.6 to 4.0 pounds of air per pound of exhaust stream in order to achieve the same results.

Supplementary water spray may be introduced at one or more locations along the length of the augmentation zone. The supplementary water spray positions are shown in FIG. 2 at reference numerals 24. The purpose of these sprays is to further cool the combined exhaust stream and augmentation stream to temperatures at which they can be further processed in pollution abatement equipment.

Figure 3:
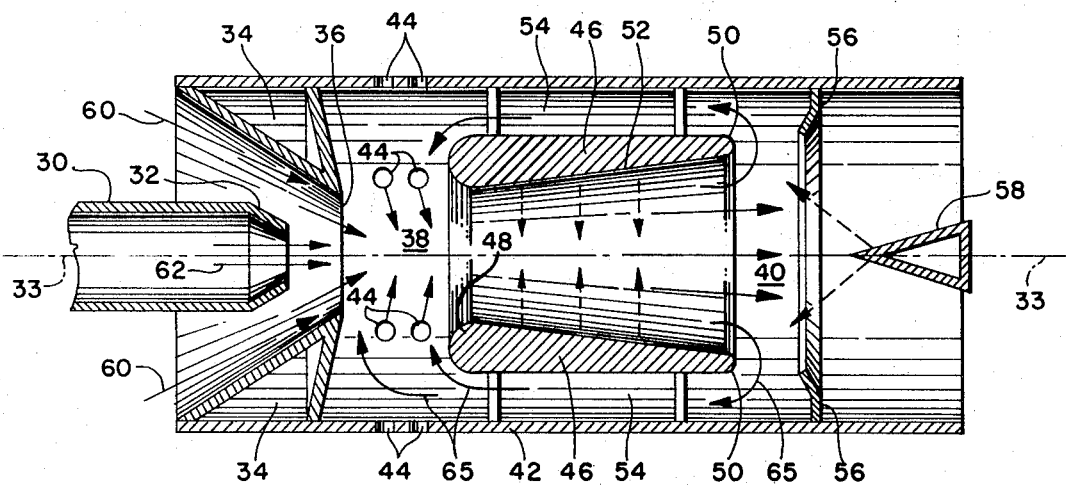
FIG. 3 is a simplified, cross-sectional view of the preferred augmenter for use in this invention, embodying a preferred process step according to this invention.

In FIG. 3, a reference numeral 30 refers to a jet engine having an after section 32. Jet engine 30 is supported on a jet test stand which is not shown. It is horizontally positioned and is coaxial with the central axis 33 of venturi 34. Throat 36 of venturi 34 leads to a mixing zone 38 and an augmenter zone 40. The apparatus of FIG. 3 includes an outer cylindrical shell 42 common to both mixing zone 38 and augmenter zone 40. Shell 42 may be of any material suitable to withstand the temperature and velocities of the jet exhaust and typically is of alloy steel construction. A plurality of water jet nozzles 44 are located about the surface of the cone of the stream passing through the throat 36 of venturi 34. These may be of any suitable design or configuration. It is their function to furnish a fine spray of water onto the surface of the core of exhaust gases and augmentation air or to direct high velocity jets of water radially into the core of exhaust gases and air.

Downstream of mixing zone 38 is an inner tubular shell 46 supported by means not shown. Tubular shell 46 is shorter in overall length than outer shell 42 and is positioned in substantially annular relation to outer shell 42. It extends from an upstream position 48 just downstream of mixing zone 38 to a position 50 nearer the downstream end of shell 42. The thickness of shell 46 is greater at its upstream end and accordingly the inner surface of shell 46 diverges outwardly from the common central axis 33 of venturi 34 and shells 42 and 46. This diverging surface is designated by reference numeral 52. Inner shell 46 and outer shell 42 form, between them, an annular zone 54.

Downstream of inner shell 46, and at the inner surfaces of outer shell 42 are annular baffles 56. These baffles are not essential; however, their emplacement in the position shown has a beneficial effect on the recycling of partially cooled exhaust flow. Still further downstream in augmenter zone 40, and coaxial with central axis 33 is conical core buster 58 which disintegrates the core of exhaust gases passing through the apparatus. Use of a core buster is optional depending largely on the effectiveness of the penetrating sprays. Core buster 58 may have spray means associated with it as is shown schematically in FIG. 3.

In operation, the hot exhaust gases leaving the after part 32 of jet engine 30 are introduced into the converging section of the venturi 34. The high velocity flow of gases creates a low pressure zone at the throat 36 of the venturi and thereby induces a flow of augmentation air through the annular space defined by the converging venturi and the after part 32 of engine 30. The stream of augmentation air is designated by reference numeral 60. The mixed stream of induced augmentation air 60 and jet engine exhaust, designated by reference numeral 62, passes through the throat 36 of venturi 34 and into mixing zone 38. Water jets are introduced into the core of mixed gases passing through the mixing zone via nozzles 44. The mixture of jet exhaust, augmentation air and water, the latter being partially vaporized passes into augmenter zone 40. As the partially cooled exhaust passes through the confines of inner shell 46 a further fine particulate spray of water may be introduced into it via supplementary spray means indicated schematically on FIG. 3. A portion of the cooled, mixed gases leaving the downstream end 50 of inner shell 46, passes around end 50 and through the annular zone 54 between the inner and outer shells. This recycle flow is indicated by reference numeral 65.

The motive force causing a portion of the gases to recycle back to the mixing zone through annular zone 54 is the pressure differential between the downstream end of the diverging zone of inner shell 46 and the reduced pressure at the mixing zone 38 which is at the vena contracta of venturi 34. By adjusting the degree of divergence of inner surface 52 of inner shell 46 and the dimensions of the annular space 54 between the inner and outer shells, it is possible to control, within limits, the amount of gases recycled to the mixing zone. Since the pressure conditions in augmenter zone 40 depend on the diameter of the outer shell, the diameter of the inner shell, the degree of divergence of the inner shell, the volume and velocity of the exhaust gases, augmentation air and water spray and other characteristics, it is not possible to exactly quantify the geometrical relationships which must be obtained in order to achieve a certain degree of recycle. It has been found, however, that it is desirable to recycle from 5 to 50 percent of the total gases passing through the downstream end of inner shell 46 back to the mixing zone. In this way, unvaporized water in the gases passing out of the inner shell is intermixed with fresh exhaust gases and more efficient use is made of the water. This in turn results in a decreased flow of augmentation air and achieves the desired results of this invention.

Although it is difficult to establish the exact geometry of a particular venturi and augmenter zone it has been found that the angle of convergence of the venturi is preferably from 15° to 45°. This is the angle between the central axis 33 and the converging surfaces of venturi 34.

Desirably, the diameter of throat 36 of venturi 34 is from 1 to 15 inches greater than the maximum flame diameter of the jet engine exhaust. This provides a sufficient annular space through which augmentation air 60 can be induced. Means may be provided to change the position of jet engine 30 along axis 33 so that different operating characteristics can be achieved or means may be provided to modulate the angle of the converging section of the venturi to achieve an optimum ratio with respect to the diameter of the jet exhaust.

It has been found that the water jets introduced via nozzles 44 into mixing zone 38 are preferably introduced radially and uniformly around the circumference of the core of exhaust. Preferably the spray is introduced at an angle of from 0° to 30° downstream of the vertical axis. The spray means may be, for example, a circular pipe having uniformly spaced holes drilled in its inner circumference at angles of from 0° to 30° to the vertical. Alternatively, the spray means may be nozzles oriented uniformly around the surface of the exhaust cone. Broadly, the spray is introduced into the exhaust stream at a rate of from 20 to 200 feet per second.

In order to achieve the recycle of gases around the inner shell 46 and through annular zone 54 in the amounts described above it has been found that the angle of divergence of the inner surface of shell 46 from the horizontal axis should be from 4° to 15°. Preferably, the angle of divergence is about 7°. As shown in FIG. 3, the forward and rear most surfaces 48 and 50 respectively of inner shell 46 are rounded in order to provide a smooth aerodynamic surface to the exhaust gases.

Desirably, the ratio of the outer diameter of inner shell 46 to the inner diameter of outer shell 42 is from 0.5 to 0.95. Best results are obtained if the ratio of these diameters is from 0.65 to 0.9. It is possible to adjust the degree of recirculation of the gases passing through inner shell 46 by changing the diameter of baffle 56. Broadly, the inner diameter of the baffle should not be less than six inches less than the outer diameter of the after end of inner shell 46. Preferably, the ratio of the inner diameter of baffle 56 to the inner diameter of outer shell 42 should be from 0.8 to 1.

FIG. 4 shows a top view of the crossflow scrubbing tower 66 positioned at the top of the stock (not shown) as represented in FIG. 1.

FIG. 5 is a front elevational view of the crossflow scrubbing tower with a packed bed at each side with a cut-out section shown on each to expose the packing 67 to view. Water pipes 78 supply water to the sprays (not shown) above each of the packed beds. Pipe 69 provided for the outlet of water collecting at the bottom of each bed. The scrubber is supported by partially shown wall structure 85.

FIG. 6 shows a side elevational view of the packed bed in scrubbing tower 66 containing packing material 67 as described herein wherein the packing material 67 is retained by grating 68 which is preferably polyethylene grating and may also be polyvinylchloride-coated expanded metal grilling advantageously of 1 ½ inch No. 6 type or 1 × 4 inch subway grating. The dust-laden gas is passed horizontally from one side of the packed bed and after impinging on the packing and depositing particles thereon passes out the opposite side into the atmosphere. The scrubbing liquid is fed in at the top of the unit through liquid inlet 70 and passes out at the bottom of the unit through outlet 69.

As shown in FIGS. 6 and 7, vertical flanges 71 and horizontal flanges 71' are the frame work for the unit supporting plates 72, 73 and 74 which hold the grating 68 in position, which in turn retains the packing units (not shown) with which the crossflow scrubber is filled. These plates are strengthened and prevented from buckling under the pressure of the packing by tie rods 75.

Manifold liquid inlet 70' feeds scrubbing liquid into a series of pipes 76, connected thereto and running horizontally in a direction perpendicular to the direction of gas flow through the unit. These pipes are perforated through that portion of their lengths extending within the scrubbing unit and are supported just under the cover plate 77. Sprays, weirs or other distributing devices may be used in place of the perforated pipes. Half pipes 78 are positioned above and half-way around perforated pipes 76 so that spray from the upper region of pipes 76 will be deflected downward into the packed section of the scrubbing unit. Dividers 79 extend the width of the scrubbing unit and extend below the level to which the scrubber is filled with packing units, so as to prevent any gas from flowing in free spaces of the unit and thereby escape contact with the packing units.

Plates 80 and 80' connect with top plate 77 together with wall 82 which forms part of the chamber wall which directs the gas coming up the shaft to pass into the scrubber beds, extending wall 81 (not shown in FIGS. 1 and 5), side walls 83 and base plates 84 and 84', to complete the enclosure of the gas space through which the dust-laden atmosphere is passed through the scrubbing unit. The scrubbing liquor after passing through the packed section passes through perforated supporting plate or grating 88 and collects in the bottom of the scrubber and is caused by inclined base plate 86 to flow out liquid outlets 69. Baffles 87 extend the width of the scrubbing unit and prevent gas flow through this open space below the packed area of the tower. These baffles have openings at the lower edges or extend only to within about ¼ to 1 inch from the bottom so that liquid may flow from one section to another. The particulates flushed from the packing units after being deposited from the gas are carried out these outlets 69 by the flow of the scrubbing liquor.

The cooling action of the water or liquid passing through the scrubbing unit causes the moisture in the gas to condense on the particles and thereby increase the effective particle size and improve the efficiency of removal of the particles from the gas. The condensation particle size increase phenomenon is increased and/or made more efficient by virtue of the vibration to which the gas stream and particles are subjected.

While this method is particularly appropriate in the range of particle sizes below 1 micron because of the greater difficulty of removing such small size particles, this improvement can also be applied to facilitating the removal of particles even larger than 1 micron by increasing the effective size by nucleation.

There is no limit to the operating temperature of the scrubber except as dictated by practical considerations. The packing units should be made of materials which can stand the particular temperature used and the scrubbing liquid will be one appropriate for contact with the gas at the particular operating temperatures. Where hot gases are being processed, steel packing can be used and the scrubbing liquid will be one which will not vaporize to any undesirable extent by contact with the hot gases. Where the hot gases are to be recycled or reused in some way, it is advantageous to remove the dust particles with varying loss of the latent heat in the gas.

The crossflow scrubbing tower has beds of packing which provide inertial impact or impingement surfaces on which the particles carried in the gas stream will be deposited by inertial impact. Desirably the packing should be of a type which will provide the least amount of resistance to gas flow with the greatest amount of surface for impingement. While several types of packing may be used which will give satisfactory but less efficient results, such as "Interlox," "Pall rings," "Raschig rings," applicant has found that the type of packing described in his U.S. Pat. No. 2,867,425, issued Jan. 6, 1959, operates much more efficiently and provides less resistance to gas flow. These are available commercially under the trademark "Tellerettes." They provide the maximum amount of surface with the least resistance to flow and therefore operate much more efficiently in the present apparatus and process than other types of packing. Other impingement surfaces may be used, such as ribbons, perforated disks, etc. but the most efficient is the "Tellerette" type of packing.

As described in detail in U.S. Pat. No. 2,867,425, a preferred packing unit consists of a single filament which is first formed into a helix having eight convolutions and then the helix bent around and the ends joined so that the unit may then be considered as having a toroidal shape defined by eight spaced, circular filament portions, each corresponding to one convolution of the helix where the spaced, circular filament portions are continuous with adjacently spaced filament portions in end to end relationship, being integral and continuous. It is immaterial whether the shape of this unit be referred to as a helical torus or as a toroidal helix and the number of convolutions may be greater or less than eight, although for best results there should be at least six convolutions and not more than twelve. Eight is believed to be the optimum. Although the unit described above may be made by first forming a single filament such as 10 into the form of a helix and thereafter bending the helix around and joining the ends thereof, it is not essential that the ends be joined so long as substantially the same form of unit, namely a toroidal helix, is produced. If the filament is sufficiently rigid, it will retain its shape even though the ends are not actually joined.

The convolutions of the toroid helix described above are approximately circular but can depart more or less from true circular. It may be, for example, polygonal. Such variations are obviously equivalent to the forms shown in the cited patent and are intended to be included in the term, "approximately circular." If the unit is composed of polyethylene or polyfluoroethylene, or a polychlorofluoroethylene (e.g. polymerized $CClF=F_2$) it will be sufficiently flexible to permit easy forming into the toroidal shape. Additionally, in such a case where the unit is made of these materials, the unit will also have nonwetting characteristics which are quite desirable. By "nonwetting," it is meant that the liquid has less attraction for the surface than required to overcome its own surface tension so that it tends rather to form aggregates than to spread out over the surface in a film. In speaking of a filament "depth" herein with respect to a rosette of the toroidal spaced filament type there is meant the thickness of the filament measured on a radius, as for instance, the distance from point 7 to point 8 on FIG. 2 of the cited patent. The "width" of the filament is that corresponding to the distance between points 5 and 6 of that same figure.

A similarly shaped unit may be formed by slicing nearly through a tubular element and then bending the unit around to the position shown in FIG. 3 of the patent and joining the portions by fusing in the case where the material of construction is thermoplastic such as polyethylene so that there results a unit having a number of rings. It will be apparent that this unit likewise has a toroidal shape defined by spaced approximately circular filament portions.

It will be obvious that other torus shaped units may be made wherein the toroidal shape is defined by spaced filament portions and that accordingly the particular shapes set forth in the drawings of the patent, which may be termed "rosettes" are not to be construed as limiting the scope of the packing to the precise shapes shown. For example, the filaments may be rectangular, square, circular, or any other appropriate shape in cross section so long as the toroidal shape of the unit is maintained wherein the torus is in effect substantially defined by spaced, approximately circular filament portions. Variations, accordingly, may be made in the shapes illustrated, but it is desirable to preserve the filamentous character of the packing, its ability to interlock one unit with another, and its characteristic of having numerous bends which may be curves or angles. Preferably the unit is manufactured from polyethylene, polyfluoroethylenes so that the unit will also have flexibility as well as the nonwetting property, and require less supporting weight.

For best results, the gross volume of each unit should be from four to 20 times its displacement volume, and the bulking volume of each unit should be from 50 percent to 90 percent of the gross volume. The term "gross volume" as used herein means the volume of the smallest circumscribed solid free from concave surfaces. The term "displacement volume" as used herein with respect to a unit of tower packing means the volume of water displaced by the unit when it is submerged by water. The term "bulking volume" as used herein with respect to a unit of tower packing means the volume occupied per unit when a receptacle of cylindrical shape is filled with such units without compression beyond that due to their own weight to a depth equal to its diameter, the volume so filled being fifty times the gross volume of one unit. It will be apparent that the bulking volume is influenced by the ability of the units to interlock with each other. In the case of a ¾ × 1 ½ inch rosette, the volume of the circumscribed rectangular prism is about 2.6 cubic inches; the gross volume is about 1.9 cubic inches; and the bulking volume is about 1.4 cubic inches.

With respect to the size of the filaments, the minimum length for one approximately circular filament portion should be at least eight times the cross sectional dimension thereof, whereas the internal radius of curvature at all points within the torus suitable are less than 4 times the major cross sectional dimension of the filament.

This type of packing used in the process and apparatus of this invention permits a reduction of the equivalent diameter of the chamber and thereby the achievement of laminar flow. For example, the Reynolds number for gas flowing in a duct 100 sq. ft. in cross section at 8 ft. per second, is 600,000. In contrast, a gas flowing at the same linear rate through a chamber having the same cross section, but filled with the packing described herein, has a Reynolds Number of approximately 2,000. Thus at the same linear velocity, the condition of gas flow changes from that of extreme turbulence to one of transitional-laminar flow. The latter type of flow permits maximum efficiency of the inertial impact mechanism.

The "Tellerette" packing when used in the process and apparatus of this invention prevents a minimum of extended surfaces to the gas flow. This is a filamentous packing presenting narrow rectangular elements to the gas flow and thereby optimizes capture of the particles. Preferably, the free volume is about 75–95 percent of the gross volume, or in other words, the gross volume is four to 20 times the water displacement volume. In addition, because of the high free volume of this type of packing, the pressure drop of the gas is low.

Crossflow application of the flushing liquid is necessary to achieve the objectives desired. In this crossflow, the gas flows horizontally and the liquid vertically downward. One of the advantages of this crossflow is that there is the absence of restricted areas for gas flow generally provided in the support plate for the packing which create problems in the formation of occlusions to flow.

Moreover, since the quantity of liquid required for flushing down the particles is a significant economic consideration, the crossflow of flushing liquid to the direction of gas flow permits a high irrigation rate with a smaller quantity of flushing liquid. The liquid consumption for the same flushing rate may be as little as only one-fourth in the crossflow system as required in the counterflow system. Moreover, since the gas stream is not working against the gravitational force of the liquid flowing through the gas stream as in the counterflow system, the pressure drop for the crossflow unit is less than one-half that obtained in the counterflow system.

For flushing the particles from the packing, any liquid is suitable provided it does not react with or become absorbed in or swell the packing material. Water is generally used but various types of solutions which are cheaply available or which are waste products from other processes can be used. For example, very often brine or sea water is more available in certain locations than fresh water and can be used advantageously. Since the flushing liquor itself becomes dirtied by the removal of the particles from the packing, it is even possible to start with liquids already dirty provided the amount of dirt present will not interfere with the removal of the deposits from the packing.

The crossflow system is designed so that there is no free space in the area of the scrubber which is being irrigated with flushing liquid. The flushing liquid can be sprayed or dripped into the packed area by various means and advantageously should have uniform distribution over the area. For example, pipes having perforations therein can be used as the spraying means. In the upper region where the pipes are located, it is desirable to have baffles running in a direction perpendicular to the direction of gas flow and extending down to the top or even below the top of the bed of packing units. This will insure contact of all the gas with the packing.

The packing units can be made of various materials such as glass, metal, ceramics, etc., but are preferably made of polyethylene or other resinous materials such as polychloroethylenes, polychlorofluoroethylenes, polytetrafluoroethylene, polypropylene, etc. Since the resin materials are of lightest weight, supporting structures can also be of lighter weight and therefore much more economical.

The process and apparatus of this invention can be used for the removal of any type of particle and from any type of gas provided that the respective materials in the gas stream are compatible or nonreactive with the materials of construction and packing used in the scrubbing units so that corrosion and deterioration will be avoided.

The length of the crossflow scrubber will be determined somewhat by the amount of particles to be removed from the gas stream and the degree to which they are to be removed. For example, in order to improve the efficiency in removal of final traces of dust, the length of the crossflow scrubber can be increased to attain such efficiencies. Where the tolerance for dust particles in the exit gas can be higher, a shorter crossflow scrubber is appropriate. Generally, however, satisfactory efficiencies are obtained in scrubbers having a length of 0.5–5 feet in the packed section. For greater efficiency, it may be desirable to use lengths of 7–12 feet in the packed section.

The other dimensions, namely the height and width will vary according to the volume of gas to be treated. Higher volumes of gas will call for greater length and/or height and existing scrubbers can be expanded for increased volume of gas by adding a second set of scrubbers above a first set or having packed beds on all four sides instead of two sides as shown herein.

The invention is best illustrated by the following examples. These examples are intended merely for purpose of illustration and it is not intended to limit the scope nor the manner in which the invention can be practiced by these examples. Except where specifically indicated other parts and percentages are given by weight.

EXAMPLE I

A TF-30 jet engine fired at maximum thrust, delivering 180 lbs/sec of exhaust gas at 600° F. is test fired into a test cell system having the arrangement and components shown in FIG. 1, the augmenter design of FIG. 3 and the scrubber design of FIGS. 4–7. A comparison run is made firing the same engine under identical conditions into a conventional system. The augmenter in the new system has an overall length of 12 ft. and a diameter of 7 ft. The crossflow scrubber has two packed beds, each 30 feet wide, 17 feet high and a thickness (in the direction of gas flow) of 5 feet 3 inches. Each bed has a vertical layer 4 feet 6 inches in depth of 2 inch polyethylene "Tellerettes" of rosette design and a 9 inch layer of 1 inch polyethylene "Tellerettes" of same design, with the 1 inch packing being on the exit side of the bed. The packing is held in position by polyethylene grating. The water flow to the scrubbing tower is 8000 GPM. The conditions and results are given in the following table:

|  | New System | Conventional System |
|---|---|---|
| Thrust from engine exhaust, lbs. | 11,200 | 11,200 |
| Particulates in engine exhaust,* Grains/SCF | 0.065 | 0.065 |
| Vibrations: cycles per sec. (Hertzians) | 30–500 | 30–500 |
| decibals | 40–200 | 40–200 |
| Quench water in Augmenter, GPM | 700 | 700 |
| Gas flow from Augmenter, ACFM | 440,000 | 850,000 |
| Temperature of gas in stack before entering scrubber, °F. | 85–128** | — |
| Temperature of exit gas, ° F. | 74–83 | — |
| Exit gas to atmosphere, ACFM | 358,000 | 850,000 |
| Particle content of exit gas, Grains/SCF | 0.0018 | 0.021 |
| Solids emitted, lbs./hr. | 5.5 | 145 |
| Fallout | None | Heavy |
| Sound level, decibels | 90 | 100 |

*Based on particulates in scrubber water plus those in exit gas.
**Shows the effect of vibration in allowing nucleation at a much lower saturation temperature. Without vibration this temperature must be taken to at least 150° F., preferably 180° F. for saturation before satisfactory nucleation is effected. In the above table the following abbreviations are used: GPM - gallons per minute ACFM - actual cubic feet per minute.

EXAMPLE II

A J-79 jet engine, fired at maximum thrust and delivering 180 lbs. of exhaust gas at 3000° F. is test fired in the same equipment as in Example I with the following results:

|  | New System | Conventional System |
|---|---|---|
| Thrust from engine exhaust, lbs. | 17,180 | 17,180 |
| Particulates in engine exhaust,* Grains/SCF | 0.54 | 0.54 |
| Vibrations: cycles per sec. (Hertzians) | 30–500 | 30–500 |
| decibals | 40–200 | 40–200 |
| Quench water in Augmenter, GPM | 1,000 | 1,000 |
| Gas flow from Augmenter, ACFA | 480,000 | 940,000 |
| Temperature of gas in stack before entering scrubber, ° F. | 85–173** | — |
| Temperature of exit gas, °F. | 62–68 | — |
| Exit gas to atmosphere, ACFM | 300,000 | 940,000 |
| Particle content of exit gas, Grains/SCF | 0.0013 | 0.018 |
| Solids emitted, lbs./hr. | 8 | 145 |
| Fallout | None | Heavy |
| Sound level, decibels | 81 | 86 |

*Based on particulates in scrubbing water plus those in exit gas.
**Shows the effect of vibration in allowing nucleation at a much lower saturation temperature. Without vibration the temperature must be taken to at least 150° F., preferably 180° F., for saturation before satisfactory nucleation is effected.

Where the vibrational effect is not provided by the source of hot exhaust gases, vibrators capable of producing vibrations in the ranges of energy and frequency specified above can be attached to the equipment to provide the desired amount of vibration.

Where impinging means other than wet packed towers are used, such as ribbons and perforated disks, the cooling for nucleation can be effected by sprays which spray cooling liquid into the gas stream prior to contact with the impinging means. In such cases the particles are removed from the impinging devices by brushes, blades, etc. However, as previously stressed the preferred and by far the most efficient are the preferred packing units described above.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for removing particulates from and reducing the noise level of the stream of high thrust hot gas emanating as the exhaust from a jet engine having a sonic vibration in said gas stream at a frequency of 30–16,000 cycles per second and an energy level of 40–200 decibels comprising the steps of:
    a. directing the flow of said hot gas stream through a hollow shell having a converging inlet section open to the atmosphere, an intermediate mixing zone and a diverging exit section communicating with a downstream cooling means having a bed of packing units, and inducing the flow of a limited amount of air into said gas stream through said inlet section;
    b. introducing a liquid into said stream of hot gas at said mixing zone, said liquid being vaporizable at the temperature of said hot gas and being effective to cool said gas while limiting the amount of air being induced therein through said inlet section;
    c. vaporizing sufficient of said liquid in said stream so that the said gas is saturated with said vapor at a temperature of 85°–200°F.;
    d. cooling said gas stream below the dew point thereof at said cooling means by passing said gas stream in one direction through said bed while passing a liquid coolant through said bed in another direction transverse to said one direction, whereby liquid is condensed on the particulates in said stream while said sonic vibration continues to exist therein;
    e. directing said stream on the surfaces of said packing units whereby said particulates are impinged and deposited on said surfaces; and,
    f. removing said deposited particulates from the said surfaces by means of the liquid coolant passing through said bed.

2. The process of claim 1 in which said liquid is water and wherein additional water is added to said gas in said diverging exit section.

3. The process of claim 1 in which the amount of induced air is 0.1 to 1.2 pounds per pound of said hot gas.

4. The process of claim 1 in which said gas stream is passed horizontally through said bed and the liquid coolant passes vertically downward through said bed.

5. The process of claim 4 in which said packing units comprise filamentous packing units having little continuous extensive surface and having about 75–95 percent free volume therein.

6. The process of claim 5 in which said filamentous packing units are made up of approximately circular, integrally connected filament portions having their axes approximately tangent to a circle at approximately evenly spaced points therearound, the number of such spaced approximately circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions.

7. The process of claim 2 wherein the amount of water introduced into said stream is 0.5–1.5 pounds per pound of said hot gas.

8. The process of claim 1 wherein the mixture of exhaust gas, induced air and vaporized liquid is received from said mixing zone into an exit section which is characterized by a tubular outer shell and a substantially concentric tubular inner shell shorter in length than said outer shell, said inner shell having an inner surface diverging outwardly from and along the central axis common to said tubular shells, whereby a portion of said mixture is recycled through the annular space between said shells to said mixing zone.

9. An apparatus for removing particulates from a stream of hot gases emanating as the high-thrust exhaust from a jet engine having a sonic vibration of 30–60,000 cycles per second and 40–200 decibels and reducing the noise level in said stream comprising:
    a. a hollow means for receiving the high-thrust hot gas stream and adapted to having the hot gas stream pass therethrough, said hollow means having a converging inlet section, an intermediate mixing zone and a diverging exit section with the upstream end of said inlet section being open to the atmosphere and suitably dimensioned to accommodate the induced flow of a limited amount of air into said gas stream;
    b. means for introducing a liquid coolant into said stream of hot gases at said mixing zone, said liquid being vaporizable at the temperature of said hot gas;
    c. and cooling means for receiving the mixture of hot gases, induced air and vaporized liquid coolant from the diverging exit section of said hollow means and for cooling said mixture below the dew point thereof whereby liquid is condensed on the particulates in said mixture while said sonic vibration continues to exist therein, said cooling means being characterized by a bed of packing units through which the said mixture is passed in one direction, and by means for passing a liquid coolant through said bed in another direction transverse to said one direction, whereby the particulates in said mixture are impinged and deposited on the surfaces of said packing units and thereafter removed therefrom by the liquid coolant passing through said bed.

10. The apparatus of claim 9 wherein the diverging exit section of said hollow means is further characterized by a tubular shell extending rearwardly from said mixing zone; and an inner tubular shell shorter in overall length than said outer shell and positioned downstream of said mixing chamber and in substantially annular relation to said outer shell, said inner shell having an inner surface diverging outwardly from and along the central axis common to said tubular shells.

11. The apparatus of claim 9 in which said packing units are characterized as having little continuous extensive surface and having about 80–85 percent free volume therein and consisting of approximately circular, integrally connected filament portions having their axes approximately tangent to a circle at approximately evenly spaced points therearound, the number of such spaced approximately-circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions.

* * * * *

UNITED STATES PATENT OFFICE
CERTIFICATE OF CORRECTION

Patent No. 3,839,846                Dated October 8, 1974

Inventor(s) Aaron J. Teller

It is certified that error appears in the above-identified patent and that said Letters Patent are hereby corrected as shown below:

Column 2, line 46, "ro" should be -- to --.

Column 11, line 56

"1 1/2" should be -- 1 7/8 --.

Column 12, line 16

"prevents" should be -- presents --.

Column 12, line 23

"four" should be -- 4 --.

Signed and sealed this 10th day of December 1974.

(SEAL)
Attest:

McCOY M. GIBSON JR.
Attesting Officer

C. MARSHALL DANN
Commissioner of Patents